United States Patent [19]

Boudreau et al.

[11] Patent Number: 4,787,060
[45] Date of Patent: Nov. 22, 1988

[54] TECHNIQUE FOR DETERMINING MAXIMUM PHYSICAL MEMORY PRESENT IN A SYSTEM AND FOR DETECTING ATTEMPTS TO ACCESS NONEXISTENT MEMORY

[75] Inventors: Daniel A. Boudreau; Edward R. Salas, both of Billerica, Mass.

[73] Assignee: Honeywell Bull, Inc., Minneapolis, Minn.

[21] Appl. No.: 931,956

[22] Filed: Nov. 24, 1986

Related U.S. Application Data

[63] Continuation of Ser. No. 481,107, Mar. 31, 1983, abandoned.

[51] Int. Cl.⁴ ............................................. G06F 12/14
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 3,815,103 | 6/1974 | Holtey et al. | 364/200 |
| 3,898,631 | 8/1975 | Brown et al. | 365/230 |
| 4,025,903 | 5/1977 | Kaufmann et al. | 364/200 |
| 4,030,080 | 6/1977 | Burkett et al. | 364/900 |
| 4,281,392 | 7/1981 | Grants et al. | 364/900 |
| 4,321,667 | 3/1982 | Robbins et al. | 364/200 |
| 4,330,825 | 5/1982 | Girard | 364/200 |
| 4,468,729 | 8/1984 | Schwartz | 364/200 |
| 4,488,257 | 12/1984 | Hosaka | 364/900 |
| 4,571,676 | 2/1986 | Mantellina et al. | 364/200 |

Primary Examiner—Gary V. Harkcom
Assistant Examiner—David L. Clark
Attorney, Agent, or Firm—William A. Linnell; George Grayson; John S. Solakian

[57] ABSTRACT

A method for determining the maximum amount of physical memory present in a data processing system that can be configured to have one or more memory modules where the memory modules may be one of several types having different amounts of memory locations. By having signals indicating the presence of a memory module and the module type directly available with minimal intervening logic, a diagnostic process can accurately determine the amount of memory present in the system and reduce the possibility of a failed memory module going undetected. A method is also descibed using these memory module present and module type signals for detecting an attempt by either the central processor or an input/output controller to access a memory location that is not physically present within the data processing system.

22 Claims, 2 Drawing Sheets

TECHNIQUE FOR DETERMINING MAXIMUM PHYSICAL MEMORY PRESENT IN A SYSTEM AND FOR DETECTING ATTEMPTS TO ACCESS NONEXISTENT MEMORY

RELATED APPLICATIONS

The following patent applications, which are assigned to the same assignee as the instant application, have related subject matter and are incorporated herein by reference.

| TITLE | INVENTORS | SERIAL NUMBER |
|---|---|---|
| Memory Identification Apparatus and Method | Edward R. Salas Edwin P. Fisher Robert B. Johnson Chester M. Nibby, Jr. Daniel A. Boudreau | 480,964, Filed March 31, 1983, now Patent No. 4,545,010, issued October 1, 1985. |

This application is a continuation of application Ser. No. 481,107 filed 3/31/83, now abandoned.

BACKGROUND OF THE INVENTION

1. Field of the Invention

The apparatus and method of the present invention generally relates to digital data processing systems and more particularly to a method of determining the maximum physical memory present in a data processing system and for detecting attempts to access nonexistent memory.

2. Description of the Prior Art

Digital data processing systems generally comprise a central processing unit (CPU), a main memory and one or more input/output devices such as card readers, magnetic tape readers, magnetic disks and printers, which are interfaced to the CPU and main memory via input/output controllers (IOC). In typical data processing systems, the amount of main memory in the system can usually be varied from some minimal amount to some maximum amount with the user of the particular data processing system determining the amount of main memory to be included in its system as a function of the size and number of computer programs to be executed and the amount of data to be processed and the speed with which the data must be processed. Therefore, in a typical data processing system, the amount of main memory actually configured within a particular data processing system can be less than the maximum amount of memory which could be configured. It is desirable to have the system know the actual amount of main memory configured within a particular system for both diagnostic and error detection purposes.

The amount of main memory actually contained within a particular data processing system can be used for diagnostic purposes when the system is initially started a to allow a diagnostic process to determine whether all of the memory contained within the system is functioning properly and when an error in main memory function is detected, an attempt can be made to isolate the error to the particular hardware component which contains a failed element. The amount of main memory actually in the particular system is also useful in detecting errors by either software or hardware that result in an attempt to address a memory location beyond those actually contained in the main memory.

One existing method of determining the actual amount of main memory physically present within a particular data processing system is to execute a firmware or software program which will initially access a memory location within the address space of the minimum amount of memory that can be present in the data processing system and if that access is successful to access a memory location that is in the next amount of memory which can be present in the system and keep incrementing the address of the main memory location to be accessed until either the main memory does not respond or an error is detected. For example, if a data processing system is capable of having up to 256K (one K=1024) words of memory present with each system having at least a minimum of 32K words of memory and with main memory being available in additional increments of 32K word modules, a program could be written to initially address a location within the first 32K words of address space and then incrementing the address so that the address would fall within the address space between 32K words and 64K words and if that access is successful, again incrementing the address by 32K such that the next address would fall between 64K and 96K, and continuing to increment the address until such time as an access failure is detected.

The method for detecting an access error may be as simple as writing a known pattern into the address location and reading it back. If the data read back from the address location is that data which corresponds to a nonexistent memory location, which will in general be either a pattern of all binary ONEs or all binary ZEROs, the sizing program can assume that the addressed location is not present in the particular system and that no memory exists above the module which was last successfully accessed. Alternatively, some data processing systems may provide for an interrupt or trap or some other indication, such as a parity error, when an attempt is made to access a nonexistent memory location. For example, U.S. Pat. No. 4,001,790 entitled, "Modularly Addressable Units Coupled In A Data Processing System Over a Common Bus", describes a system in which an attempt to access a nonexistent memory location will result in a time out occurring because no memory module within the system has responded positively within a predetermined period. This time out will cause the CPU to trap to a software routine to handle the occurrence of an attempt to access a nonexistent memory location. U.S. Pat. No. 4,340,933 entitled, "Data Processing System Having Centralized Nonexistent Memory Address Detection", describes an alternative system wherein the maximum amount of memory thatis physically present within the computer system is set within a switch within the CPU and each attempt to access the memory, whether it be by the CPU or an I/O device via an I/O controller, is compared with this maximum memory present in the system. If the memory address exceeds that which is physically present in the system, no attempt is made to access the memory and a trap occurs which can be handled by a software routine.

Once the maximum amount of physical memory is determined, the diagnostic routine can extensively exercise the memory checking whether each location can be written into and read back from without error and detect memory problems so that they may be reported.

However, because the above described methods for determining the maximum physical memory which is present in the system require than an extensive amount of the logic within the system be functional, there are cases in which a failure within one of many components will result in the diagnostic process thinking that less memory is present in the system than there actually is. This will result in the diagnostic process only exercising the amount of memory which it determines to be in the system and will result in a failure going unreported because the diagnostic program has successfully exercised all of the memory it thought was present but has not exercised some of the memory which is actually present but failed.

Further, the above techniques do not permit the ready determination of which memory module has actually failed in some instances. For example, if the memory system has a memory module which can either contain 32K words of memory or 64K words of memory with each memory module being contained on a single printed circuit board, if the diagnostic program determines that a problem has occurred in the second 32K of memory, it does not necessarily know in which memory module (printed circuit board) the fault is contained in. For example, if a particular system is configured with 96K words of memory, it may be possible to configure that system using a first memory module contains 64K words of memory and a second memory module containing 32K words of memory or a first memory module contains 32K words of memory and a second module containing 64K words of memory or three 32K word modules. In this case, if a fault is detected in the second 32K words of memory, the diagnostic program can not determine whether the first memory module must be replaced which is the case if the first memory module contained 64K words of memory or if the second memory module must be replace which is the case if the first memory module contains only 32K words of memory.

Therefore, what is desired is an inexpensive method of determining the maximum physical memory present within a system which does not involve exercising a large amount of logic so that one can be confident that the maximum amount of memory visible to a diagnostic process is truly the upper limit of physical memory and does not reflect a system having a larger amount of memory, the upper portion of which has failed. Further, it is desired to have a system that permits a fault to be isolated to a failing memory module so that a diagnostic program can indicate to a service person which printed circuit board within the system should be replaced.

OBJECTS OF THE INVENTION

Accordingly, it is an object of the present invention to provide a method for determining the maximum amount of memory physically present in a system that can distinguish between the absence of a memory module and the presence of a failed memory module.

It is another object of the present invention to provide a low cost method for determining the maximum amount of physical memory present in a system.

It is a further object of the present invention to provide a method for detecting an attempt to access a nonexistent memory location that is simple to construct.

It is a yet further object of the present invention to provide a low cost method of detecting an attempt to access a nonexistent memory location.

This invention is pointed out with particularity in the appended claims. An understanding of the above and further objects and advantages of this invention can be obtained by referring to the following description taken in conjunction with the drawings.

SUMMARY OF THE INVENTION

The foregoing objects are achieved by providing that in a system capable of containing one or more memory modules, wherein each memory module contained in the system can be one of several types, with each type having a predetermined number of memory locations, each position to which a memory module can be connected to the system provides a first signal which when in one state indicates that a memory module is physically connected to the position and in another state indicates that a memory module is not physically connected to the position. In addition, each position to which the memory module can be connected provides a second signal which indicates the type of memory module, and thereby the amount of memory locations contained within the module, that is connected to the module position. By making these first and second signals from each memory position available to a diagnostic means, the diagnostic means can compute the total amount of memory physically connected within the system. This total amount of memory computed by the diagnostic means can be further checked by the diagnostic means attempting to access at least one location within each possible increment of memory by writing into the location a predetermined value and then reading back from the location and seeing whether the predetermined value is returned. By imposing system configuration rules which require that all memory modules connected within a particular system be of the same type, the second signals from each module position can be combined thereby reducing the total number of second signals which need be available to the diagnostic means. By having each memory module automatically generate the first and second signals when it is physically connected to the system, the amount of memory present within the system can be automatically determined without requiring any manual setting of switches or indicators as memory modules are either added or removed from the system. By having two methods of determining the amount of memory physically connected within a system with one method requiring the proper function of a minimal amount of logic within the system, the results of the two determinations can be compared and an error in one or the other can be diagnosed. By selecting the states of the second signals which indicate the type of memory module connected to the memory module position to indicate a memory module type which contains the larger amount of memory if the signals of two dissimilar memory modules are ORed together, a diagnostic program can detect when the configuration rule which requires all memory module types to be of the same type is violated. These first and second signals from each memory module position can also be used to dynamically check whether an address being presented to memory is within the memory physically present within the system. This dynamic checking of memory addresses is done by comparing the address of the last location of memory within the system as indicated by the first and second signals with the address presented to memory and indicating a fault if the address presented memory exceeds the address of the last location physically present in memory. By binary encoding the addresses presented to memory and the address of the last location contained in memory, the least significant bits, which correspond to the number of bits needed to encode the highest address location in a minimal size memory module, can be ignored. The system provides that the addresses presented to memory may be generated by either the central processing unit or an input/output controller and therefore generates one of two error signals depending upon whether an address which exceeds the address of the last location physically present in memory was generated by the central processing unit or an input/output controller.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
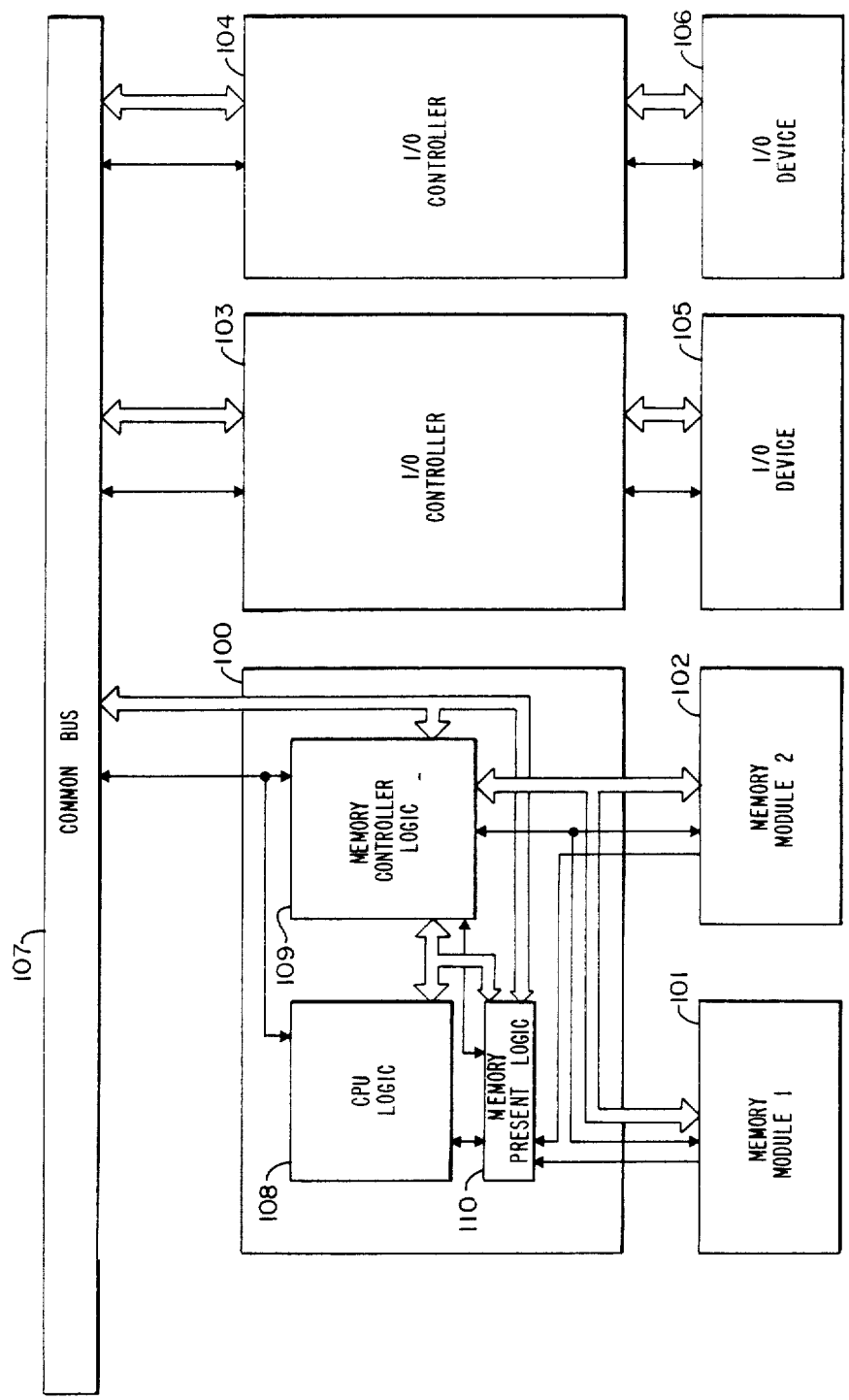
FIG. 1 is a general block diagram of a data processing system including the memory present logic of the present invention.

FIG. 1 shows a data processing system comprised of a CPU/memory board 100, memory module 1 101, memory module 2 102, a first I/O controller 103 with an attached I/O device 105 and a second I/O controller 104 with an attached I/O device 106, and common bus 107. In FIG. 1, the thinner lines connecting the various components are control lines and the thicker lines connecting the components are data/address lines.

CPU/memory board 100 is a single printed circuit board which connects to common bus 107. CPU/memory board 100 contains both the CPU logic 108 and the memory controller logic 109. In addition, CPU/memory board 100 contains memory present logic 110. There is no main memory contained within CPU/memory board 100 and main memory for holding data and software instructions is provided by connecting one or more memory modules such as memory module 1 101 and memory module 1 102. All accesses to the main memory contained in memory module 1 and memory module 2 are via memory controller logic 109. Memory controller logic 109 is dual ported such that one port connects to common bus 107 so that memory requests and data transfers may be made either I/O controller 103 or I/O controller 104 via common bus 107 whereas requests for memory from the CPU logic 108 for data or software instructions normally take place directly between CPU logic 108 and memory controller logic 109 without going via common bus 107.

Within the preferred embodiment, each memory module 101 and 102 can contain either 128K, 256K, 512K or 1024K words of main memory. In the preferred embodiment, each word of memory contains 16 bits of data which can also be addressed as two 8-bit bytes. In the preferred embodiment, the memory is comprised of MOS semiconductor chips with each location memory actually containing 22 bits of information with 16 of the bits being used for the 16 bits of data in the word and 6 bits being used for error detection and correction (EDAC). Each memory module is a separate physical printed circuit board which contains either 44 MOS memory chips in a standard density version or, in the double density version, 88 MOS memory chips. Memory modules are designed to be implemented using either 64K bit MOS memory chips or 256K bit MOS memory chips. If the 64K bit chips are used in the single density (44 chip) configuration, the memory module will contain 128K 22-bit EDAC words with each word containing 16 data bits. If the 64K bit MOS memory chips are used in the double density configuration, each memory module contains 256K words of memory. If the 256K bit MOS memory chips are used in the single density configuration, each memory module contains 512K words of memory and if the 256K bit chips are used in the double density configuration, each memory module contains 1024K words of memory.

Figure 2:
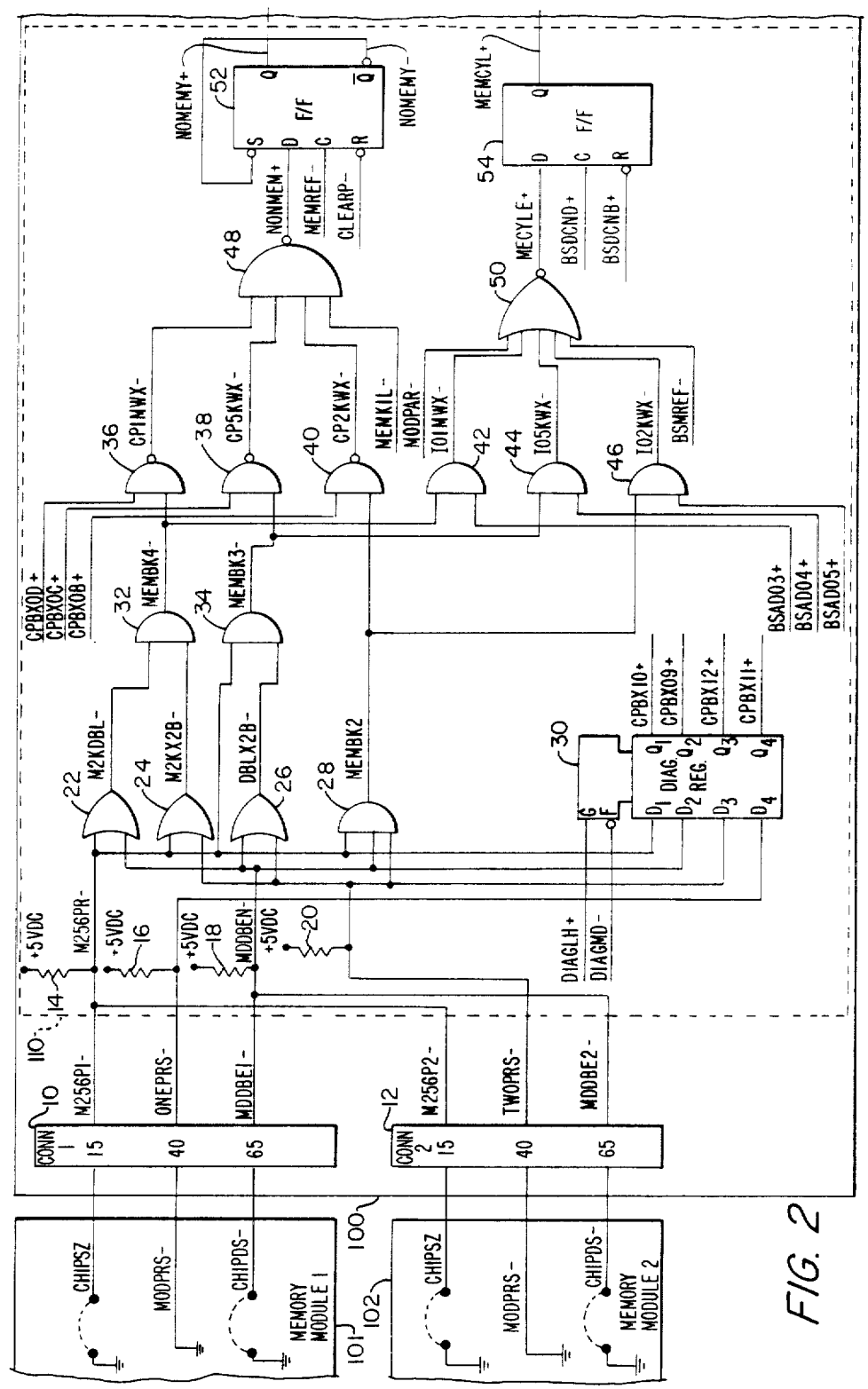
FIG. 2 is a logic block diagram of the memory present logic of the present invention.

Memory present logic 110 is provided to indicate the amount of memory present in the system (i.e., whether one or two memory modules are present and the size of each memory module) and to detect an attempt to access a memory location which is beyond that which is physically present within the system. FIG. 2 is a logic block diagram of memory present logic 110 of found on CPU/memory board 100. In FIG. 2, the small circles on the inputs or outputs of the logic elements represent inverting inputs and outputs respectively.

FIG. 2 illustrates the memory present logic 110 of the preferred embodiment and is used to indicate to the firmware which drives CPU logic 108 and the software executed by the CPU, the amount of main memory physically present within the data processing system, and is used to detect an attempt to access a main memory location that is beyond that physically present in the system. These attempts to access a main memory location beyond that present within the system may originate from an I/O controller such as I/O controller 103 or 104 requesting a location to be written into or read from main memory or by CPU 108 attempting to access a software instruction from the main memory or read data from or write data into the main memory.

FIG. 2 shows only a portion of the printed circuit board which contains memory module 1 101 and a corresponding portion of the printed circuit board which contains memory module 2 102. In addition, FIG. 2 shows only a portion of CPU/memory board 100 which contains memory present logic 110 and the connectors which are used to attach memory module 1 and memory module 2 to CPU/memory board 100. FIG. 2 illustrates only those signals which are of interest in discussing memory present logic 110 and does not show the address/data lines that connect memory modules 101 and 102 to memory controller logic 109 and, in addition, control lines that are not used by memory present logic 110 are also not illustrated.

As described above, memory present logic 110 serves two functions. The first function is to determine the amount of main memory physically present within the system and the second function is to on-the-fly detect an attempt to access a nonexistent memory location. The determination of the maximum memory present function will be described first followed by a description of the detection of an attempt to access a nonexistent memory location function.

Determination of Maximum Memory Present

FIG. 2 shows that memory module 1 101 is connected to CPU/memory board 100 via connector 1 10 and memory module 2 102 is connected to CPU/memory board 100 via 1 12. Connector 1 10 and connector 1 12 are each 80 pin connectors. Each memory module provides three signals which are used by memory present logic 110 to determine the amount of memory present in a memory module and whether or not the memory module is physically present within the data processing system (i.e., whether or not is connected to CPU/memory board 100). The chip size signal, CHIPSZ-, which is connected to pin 15 of the connectors is used to indicate whether the memory module contains 64K bit MOS memory chips or 256K bit MOS memory chips. If the jumper (indicated by the dashed arch in FIG. 2) is in place, it indicates that 256K bit chips are present in the memory module and if the jumper is not in place, it indicates that 64K bit chips are used. The module present signal, MODPRS-, which is connected to pin 40 of the connectors, is used to indicate whether a memory module is present or not. The chip density signal, CHIPDS-, which is connected to pin 65 of the connectors, is used to indicate whether the memory module contains the standard density of 44 memory chips per memory module or the double density of 88 memory chips per memory module. If the jumper is present, signal CHIPDS- indicates that it is a double density memory module and if the jumper is absent, signal CHIPDS- indicates that it is a standard density memory module.

As illustrated in FIG. 2, signal M256P1- from pin 15 of connector 1 10 is wire-ored together with signal M256P2- from pin 15 of connector 2 12 to produce signal M245PR- which is one input to diagnostic register 30. Signal M256PR- is connected to a +5 volts DC via pull-up resistor 14 such that if both the jumpers which connect signal CHIPSZ- to ground in memory module 1 101 and memory module 2 102 are not present, signal M256PR- will be a +5 volts DC which is a binary ONE and the corresponding output of diagnostic register 30, signal CPBX10+, will be a binary ONE indicating that the memory chip size is 64K bits. If either memory module 1 or 2 contains the jumper connecting signal CHIPSZ- to ground, signal M256PR- will be 0 volts DC which is a binary ZERO ant the corresponding output of diagnostic register 30, signal CPBX10+, will be a binary ZERO indicating that the memory modules contain 256K bit chips.

As can be appreciated by examination of FIG. 2, the presence of a jumper connecting signal CHIPSZ- to ground in either memory module 1 or memory module 2 will result in signal M256PR- being a binary ZERO irrespective of whether the other memory module contains the jumper and thus, if either memory module contains 256K byte memory chips, the output of the diagnostic register, signal CPBX10+, will indicate that the memory contains 256K bit chip memory modules even though one of the memory modules may contain only 64K bit chips. This does not present a problem because the physical configuration rules of the data processing system of the preferred embodiment require that both memory modules be of the same type. That is, they must both contain either 64K bit chips or 256K chips. By choosing the presence of the jumper to indicate the larger size module modules (i.e., if the jumper is present it indicates that 256K bit chips are being used), the presence of one large module and one small module will be detected because the diagnostic program will assume that two larger modules are present as indicated by signal CPBX10+ and will calculate the amount of memory physically present within the system based upon use of the larger size memory modules. An attempt will be made to access each memory location by writing into and and reading back from it that is indicated to be physically present in the system. The reading back from a location that does not exist within the system will result in incorrect data, usually all ONEs or all ZEROs, and this will be detected as an error.

The chip density signal from pin 65 of connector 1 10, MDDBE1- is wire-ored with the chip density signal MDDBE2- from connector 2 11 to produce signal MDDBEN- which is also connected via a pull-up resistor 18 to +5 volts DC. Signal MDDBEN- is also input to diagnostic register 30 to produce signal CPBX09+, which is a binary ZERO, indicates that double density chip configurations are present on all memory modules within the system. If signal CPBX09+ is a binary ONE, it indicates that only standard density memory modules are present within the system. As in the case of chip size, the chip density signal MDDBEN- will indicate double density modules if either memory module is a double density memory module such that this signal will indicate the maximum amount of memory that could be present in the system if either memory module is a double density memory module. Thus, if the configuration rules are not followed and a standard density memory module is configured with a double density memory module, the memory present logic will work under the assumption that only double density memory modules are present and calculate the maximum memory physically present in the system based on the assumption that only double density modules are present. As in the case of the chip size, when the diagnostic program attempts to access each memory location within the main memory by writing and then reading back a pattern, the reading back from a nonexistent memory location will result in an error which will be detected by the diagnostic program and the fact that nonhomogeneous memory modules are present in the system can be detected.

Module 1 present signal ONEPRS- is connected to pin 40 of connector 1 10 and is connected via pull-up resistor 16 to +5 volts DC such that the output of diagnostic register 30, signal CPDX11+ will be a binary ZERO if memory module 1 is present and a binary ONE if memory module 1 is not present. Similarly, module 2 present signal TWOPRS- is connected to pin 40 of connector 2 12 and via pull-up resistor 20 to a +5 volts DC such that the corresponding output of diagnostic register, signal CPBX12+, will be a binary ZERO if memory module 2 is present and a binary ONE if memory module 2 is not present.

In the preferred embodiment, all six signals which are combined to produce the four signals which are input into diagnostic register 30 are static signals and do not change dynamically as a function of the operation of the data processing system and therefore diagnostic register 30 could be a group of four parallel driver circuits, one for each signal, MDDBEN-, M256PR-, ONEPRS- and TWOPRS- which correspond to signals CPBX09+ through CPBX12+ respectively, or the signals MDDBEN- through TWOPRS- could be used directly. In the preferred embodiment, diagnostic register 30 is a type SN74S373 octal D-type transparent latch manufactured by Texas Instruments, Inc. of Dallas, Tex. and described in their publication entitled, *The TTL Data Book for Design Engineers*, Second Edition, copyrighted 1976 and incorporated herein by reference.

In normal operation diagnostic register 30 has signal DIAGLH+ at its enable (G) in the binary ONE state which provides that the output (Q) signals will follow the data (D) input signals. The outputs of diagnostic register 30 are three state outputs and are controlled by signal DIAGMD- at the F input. The Q outputs will not be in the high impedance state as long as the signal is in the binary ZERO state. When the input enable signal DIAGLH+ goes to the binary ZERO state the Q outputs will be latched at the level of the data (D) inputs. As indicated above, normally the input enable signal remains in the binary ONE state and therefore the diagnostic register is transparent with the outputs following the inputs. Under normal conditions the four signals of interest which indicate whether one or two memory modules are present and the chip size and the chip density of the modules are of a static nature and do not change over time except if different printed circuit boards are inserted within the data processing system. However, this diagnostic register 30 is also shared with other input signals (not shown in FIG. 2) which indicate the particular memory location being addressed and if a memory error is detected, the diagnostic register can be latched by making the input enable signal, DIAGLH+, a binary ZERO and thus latch up the address of the memory location which was found to be in error. The four output signals from diagnostic register 30, signal CPBX09+ to be a binary ZERO. Similarly, if memory module 2 is present, signal MODPRS- at pin 40 of connector 2 12 will cause signal TWOPRS- to be a binary ZERO and cause its corresponding output of diagnostic 30, signal CPBX11+, to be a binary ZERO. If both memory module 1 and memory module 2 are comprised of 64K bit MOS memory chips, neither memory module will have the jumper having connecting signal CHIPSZ- to ground and therefore both signals M256P1- and M256P2- will be binary ONEs which when ORed together produce signal M256PR- to be a binary ONE which will result in its corresponding output of diagnostic register 30, signal CPBX10+, being a binary ONE. If module 1 is a standard density module containing 44 MOS memory chips, the jumper connecting signal CHIPDS- to ground will not be present so that signal MDDBE1 from pin 65 of connect 1 10 will be a binary ONE. However, if memory module 2 is a double density memory module containing 88 MOS memory chips, and therefore has the jumper on signal CHIPDS- connecting it to ground, signal MDDBE2- will be a binary ZERO and cause signal MDDBEN- to be a binary ZERO which in turn will cause its corresponding output of diagnostic register, signal CPBX09, to be a binary ZERO.

TABLE 1

| CPBX12+/ TWOPRS- | CPBX11+/ ONEPRS- | CPBX10+/ M256PR- | CPBX09+/ MDDBEN- | TABLE INDEX | FIRST LOC. | LAST LOC. | TOTAL WORDS |
|---|---|---|---|---|---|---|---|
| 1 | 1 | 1 | 1 | 15 | 0 | 0 | 0 |
| 1 | 1 | 1 | 0 | 14 | 0 | 0 | 0 |
| 1 | 1 | 0 | 1 | 13 | 0 | 0 | 0 |
| 1 | 1 | 0 | 0 | 12 | 0 | 0 | 0 |
| 1 | 0 | 1 | 1 | 11 | 0 | 128K−1 | 128K |
| 1 | 0 | 1 | 0 | 10 | 0 | 256K−1 | 256K |
| 1 | 0 | 0 | 1 | 9 | 0 | 512K−1 | 512K |
| 1 | 0 | 0 | 0 | 8 | 0 | 1024K−1 | 1024K |
| 0 | 1 | 1 | 1 | 7 | 128K | 256K−1 | 128K |
| 0 | 1 | 1 | 0 | 6 | 256K | 512K−1 | 256K |
| 0 | 1 | 0 | 1 | 5 | 512K | 1024K−1 | 512K |
| 0 | 1 | 0 | 0 | 4 | 1024K | 2048K−1 | 1024K |
| 0 | 0 | 1 | 1 | 3 | 0 | 256K−1 | 256K |
| 0 | 0 | 1 | 0 | 2 | 0 | 512K−1 | 512K |
| 0 | 0 | 0 | 1 | 1 | 0 | 1024K−1 | 1024K |
| 0 | 0 | 0 | 0 | 0 | 0 | 2048K−1 | 2048K |

CPBX09+ through CPBX12+, are available and can be read by both the firmware which controls CPU logic 108 and they are also visible to software programs executing within the central processing unit such that both the firmware and the software can use the four signals which relate to the number of memory modules present in the size of the memory within each module for diagnostic purposes.

As indicated above, the four signals, CPBX09+ through CPBX12+, from diagnostic register 30 can be used by a diagnostic program (either firmware or software) to directly determine the amount of memory physically present within a data processing system. For example, if the state of each of the four signals is used as a bit within a four bit table index as indicated in Table 1, the state of these four signals can be used to index (see column 5 of Table 1) into a table (such as columns 6 and 7 in Table 1) which contains the address of the first memory location physically present in the memory and the address of the last location physically present in memory. For example, if memory module 1 is present within a data processing system, signal MODPRS- at pin 40 of connector 1 10 will be a binary ZERO causing signal ONEPRS- to be a binary ZERO at the third data (D) input of diagnostic register 30 and causes corresponding output signal CPBX12+ to be a binary ZERO.

Using these four signals from the diagnostic register 30 as an index into Table 1 (see row 14 of Table 1), we see that the table index value is 2 and if this value is used to index into the first location column, we see that the first location contained within memory is location 0 and if this same table index of 2 is used to index into the last location column, we see that the last location within memory is 512K-1. Therefore, the diagnostic program can attempt to exercise each individual location 0 through the last location 512K-1 by writing in a predetermined value into the location and then reading back to see if that value was read from the location. In the above example where the configuration rule that requires both memory modules to be of the same type has been breached, because in the above example, although both modules contain 64K chips, memory module 1 is a standard density and thus contains 128K words of memory and the memory module 2 is a double density module and therefore contains 256K words of memory.

Therefore, when the diagnostic program, if the memory is working properly, will successfully by written into and read from for locations 0 through 128K-1 which are contained in memory module 1 but the diagnostic program will be unsuccessful in attempting to write into and read back from locations 128K through 256K-1 because they are not physically present within the system. If the diagnostic program continues, it will be able to successfully write into and read back from locations 256K through 512K-1 which are present in memory module 2. Thus, it can be appreciated that by a diagnostic program using the output of diagnostic register 30, the violation of the configuration rule, which call for both memory modules having to have the same chip size and chip density, can be detected.

It will be appreciated that the requirement that both memory modules be of the same type could be relaxed if the chip size and chip density signals from the memory modules were not ORed together and were individually available from diagnostic register 30, so that instead of the six signals being combined into four signals, the six signals were each individually available at the output of diagnostic register 30. It will also be appreciated that this method of determining the maximum amount of memory present in the system will work if more than 2 memory modules are configurable within the system and if more than or less than four different types of memory modules are available for configuration within the system. The requirement being that the memory types and the memory modules present be available to a diagnostic program.

The advantage of the above described method for determining the maximum amount of memory present within the system are several fold. First, the reconfiguration of the system memory by either additions or subtractions of memory modules or the change of memory modules is automatically visible to a diagnostic program within the system. That is, the addition or subtraction of a memory module or change of memory module type does not require the manual setting of any switches, which are themselves prone to failure, within the system which can result in error in switch setting with the possibility that memory that is physically present will not be used or visible to the system and will be ignored. If the switches are incorrectly set to indicate that there is more memory present than is physically present, this error will usually be detected by most systems because an attempt to access the non-present memory will result in an error when the information is attempted to be read from the non-present memory. The second advantage is that by choosing the default conditions with respect to memory type, those signals which are ORed together before being input into the diagnostic register 30, the system provides that the diagnostic program will assume that there is more memory physically present than there actually is and this error can be detected by a diagnostic program attempting to write into and read from the memory. The third advantage is that there is a minimal amount of logic in any of the signal paths for signals input into the diagnostic register 30 such that the diagnostic program can be assured with relative certainty that the memory size signals that are output by the diagnostic register 30 are error free and truly reflect the amount of memory physically present within the system such that all memory physically present in the system will be exercised by a diagnostic program. The case of a logic element failing and causing the diagnostic program to believe there is less memory than there actually is minimized. Therefore, any failure within the memory system will be detectable by a diagnostic program.

For example, if there was a large amount of combinational logic prior to the inputting of the signals to the diagnostic register 30, a failure of one of the logic elements could result in the diagnostic register thinking that there was only 128K memory within the system whereas in fact there was 512K words of memory. Under these conditions, the diagnostic program would only exercise that first 128K of memory and find that it was completely working when in fact there was a failure in the module containing the locations 256K through location 512K-1 and this failure could go undetected by the diagnostic program. By minimizing the amount of logic used to indicate the memory size to the diagnostic program, the diagnostic program can be relatively sure, if a memory failure is detected in accessing a portion of the memory which is indicated to be present by the diagnostic register 30, that the error is within the combinational logic used to access the memory and not in error in combinational logic associated with logic that is used to determine the amount of memory present in the system.

Detection of Attempts to Access a Nonexistent Memory Location

As discussed above and as illustrated in FIG. 1, memory may be the address of the memory location to be accessed to memory controller logic 109 via common bus 107 or the memory may be accessed by CPU logic 108 presenting the address of the location to be accessed to memory controller logic 109. In the data processing system of the preferred embodiment, word addresses are presented to the memory as a 20-bit binary encoded address with the most significant bit being 20 and the least most significant bit being bit 1. As indicated above, the second purpose of memory present logic 110 is to determine whether an attempt is being made to access a memory location which is not physically within the system. As illustrated in FIG. 2, memory present logic 110 dynamically checks each memory address as it is presented to determine whether or not there is sufficient memory configured within the system to contain the location that is being addressed. This check is done on the fly as each address is presented to the memory controller logic 109.

In FIG. 2, the three signals representing the three most significant bits of an address from the CPU logic 108 are compared with three signals indicating the type of memory modules contained within the data processing system by NAND gates 36, 38, 40 and 48 and the output of which is clocked into flip-flop 52 if a memory address from the CPU is being presented to the memory controller logic 109 and the three signals representing the three most significant bits of an address from an I/O controller via common bus 107 are compared by AND gates 42, 44 and 46 with the signals representing the types of modules configured within the data processing system and the output of these AND gates is combined by NOR gate 50 and the output of which is clocked into flip-flop 54 if an I/O controller is presenting an address to memory controller logic 109.

Table 2 summarizes the four types of memory modules which can be configured within the data processing system of the preferred embodiment. If signal M256PR- is a binary ONE, the memory module contains 256K bit chips and if MDDBEN- is a binary ONE, the memory module contains 44 of the chips, which is standard density, and therefore the memory module contains 128K words (see row 1 of Table 2). If signal M256PR- is a binary ONE, the memory module contains 64K bit chips and if signal MDDBEN- is a binary ZERO, the memory module contains 88 memory chips and therefore contains a total of 256K words of memory. If signal M256PR- is a binary ZERO, the memory module contains 256K bit chips and if signal MDDBEN- is a binary ONE, the memory module contains 44 of those chips and therefore contains 512K words. If signal M256PR- is a binary ZERO, the memory module contains 256K chips and if signal MDDBEN- is a binary ZERO, it contains 88 such chips and therefore contains 1024K words of memory. Thus, Table 2 illustrates that memory modules within the data processing system can contain either 128K, 256K, 512K or 1024K words of memory in each memory module.

dress the main memory of the data processing system of the preferred embodiment. Bit 20 is the most significant bit of the address and if the address comes from CPU logic 108 it is represented by signal CPBX0D+ and if the address comes from an I/O controller via common bus 107 it is represented by signal BSAD03+. The corresponding address signals for the CPU and the common bus are also illustrated for bits 19, 18 and 17.

TABLE 3

| Bit 20<br>CPBX0D+/<br>BSAD03+ | Bit 19<br>CPBX0C+/<br>BSAD04+ | Bit 18<br>CPBX0B+/<br>BSAD05+ | Bit 17<br>CPBX0A+/<br>BSAD06+ | Address Range | Minimum Module Configuration |
|---|---|---|---|---|---|
| 0 | 0 | 0 | 1 | 64K to 128K−1 | 64K-std |
| 0 | 0 | 1 | X | 128K to 256K−1 | 64K-std*2; 64K-dbl |
| 0 | 1 | X | X | 256K to 512K−1 | 64K-dbl*2; 256K-std |
| 1 | X | X | X | 512K to 1024K−1 | 256K-std*2; 256K-dbl |

TABLE 2

| M256PR− | MDDBEN− | MEMORY MODULE DESCRIPTION |
|---|---|---|
| 1 | 1 | 64K chips, standard density = 128K words |
| 1 | 0 | 64K chips, double density = 256K words |
| 0 | 1 | 256K chips, standard density = 512K words |
| 0 | 0 | 256K chips, double density = 1024K words |

As discussed above with respect to the use of diagnostic register 30 to determine the maximum amounts of memory physically configured within the data processing system, the memory present logic 110 also dynamically compares each address as it is presented to memory with the maximum amount of memory configured in the system. In the preferred embodiment, the logic 110 configuration rule which requires that both memory modules must be of the same type is used to simplify the logic which determines if the addressed location is present. In addition, this logic which dynamically determines whether the address exceeds the amount of memory physically present in this system also assumes that the configuration rule which requires that any minimum memory module 1 101 is present within the system and therefore does not check the status of signal ONEPRS-, which indicates whether or not memory module 1 is present. As discussed above, these two assumptions (i.e., that both memory modules are of the same type and that a minimum memory module 1 is present) if violated can be detected by a diagnostic program (firmware or software) before the data processing system is used for production and therefore compliance with these configuration rules need not be checked dynamically by additional logic as each address is presented to the main memory.

Before discussing in detail the method by which the address presented to memory is compared to see whether the memory is physically configured within the system with respect to FIG. 2, the basis for the logic will be discussed with respect to Table 3. The four left columns in Table 3 correspond to the four most significant bits in the 20 bit addresses which are used to ad- The address range column in Table 3 represents the range of the address which corresponds to the four most significant bits of a 20 bit address contained in that row. The minimum module configuration indicates the minimum type of memory module which must be configured in a system to provide the amount of memory required if the address is to fall within the memory. For example, in the first row of Table 3, if bit 20 is a ZERO bit, 19 is a ZERO bit, 18 is a ZERO and bit 17 is a ONE, and bits 16 through bit 1 are don't care conditions (represented by an X in Table 3), either binary ONEs or binary ZEROs, then the address represented by that bit configuration will fall within the range from 64K to 128K-1 and therefore a single memory module comprised of 64K chips in the standard density which contains 124K words of memory, will be sufficient to guarantee that the address falls within the main memory physically present within the system. Similarly, in the second row of Table 3, if bit 20 is a ZERO, bit 19 is a ZERO, bit 18 is a ONE and bit 17 through bit 1 are don't care conditions, then the address falls within the range 128K to 256K-1 and the memory must contain either two memory modules having 64K chips in the standard density, which together will contain 256K words of memory or a single memory module having 64K chips in double density, which contains 256K words of memory. Rows 3 and 4 of Table 3 illustrate the cases where bit 19 is a binary ONE or bit 20 is a binary ONE or there is two corresponding address ranges and minimum module configurations.

In FIG. 2, OR gate 22 has inputs, signals M256PR- and MDDBEN- which are ORed together to produce output signal M2KDBL-. By referencing Table 2, it can be appreciated that signal M2KDBL- from OR gate 22 will be a binary ZERO when both input signals are binary ZEROs and therefore when a binary ZERO indicates that there is a minimum 1024K words of main memory configured within the system (see row 4 of Table 2). OR gate 24 has inputs signals M256PR- and TWOPRS-. By referencing Table 2, it can appreciated that if the output of OR gate 24, signal M2KX2B-, is a binary ZERO, there must be a minimum 1024K words of main memory configured within the system because the smallest memory module which has signal M256PR- a binary ZERO contains 512K words of memory and signal TWOPRS- being a binary ZERO indicates that there are two memory modules present so therefore there must be a minimum 1024K words present. Therefore, if either signal M2KDBL- or signal M2KX2B- is a binary ZERO, the output of AND gate 32, signal MEMBK4-, will be a binary ZERO and indicate that at a minimum there is 1024K words of memory within the system.

If signal CPBXOD+ is a binary ONE at one input of NAND gate 36, it indicates that the address being presented to the memory from the CPU is within the range 512K to 1024K-1 (see row 4 of Table 3) and therefore at a minimum the data processing system must have 1024K words of memory. The other input to NAND gate 36, signal MEMBK4-, as discussed above, will be a binary ZERO if there are 1024K words of memory within the system and therefore partially disable NAND gate 36 and cause the output, signal CPIMWX-, to be a binary ONE if the address falls within the minimum amount of memory physically present within the system.

One input to OR gate 26 is signal MDDBEN- which will be a binary ZERO if a double density memory module is configured within the system. By reference to Table 2, it can be seen that the minimum double density memory module contains 256K words of memory. The other input to OR gate 26 is signal TWOPRS- which when a binary ZERO indicates that the second memory module is configured and therefore there must be two memory modules configured in the system. Therefore, the output of OR gate 26 will be a binary ZERO if there are two double density memory modules configured and therefore at the minimum, the signal when a binary ZERO indicatees that there is at least 512K words of main memory within the system. Signal DBLX2B-, when a binary ZERO, will disable AND gate 34 and cause its output, signal MEMBK3-, to be a binary ZERO if there are at a minimum 512K words of memory within the system. The other input to AND gate 34, signal M256PR-, will be a binary ZERO and disable AND gate 34 if there are at a minimum 512K words of memory present within the system (see rows 3 and 4 of Table 2). Therefore, signal MEMBK3- will be a binary ZERO if there are, at a minimum, 512K words of memory configured within the system. NAND gate 38 will be partially enabled by signal CPBXOC+ being a binary ONE, which indicates that bit 19 of the address is a ONE and therefore a minimum of 512K words of memory must be provided to insure that the address falls within the physically available memory (see the third of row of Table 3). Therefore, if signal MEMBK3- is a binary ZERO at the other input of NAND gate 38, NAND gate 38 will be disabled and its output, signal CP5KWX-, will be a binary ONE thereby indicating that the minimum amount of memory necessary to satisfy the address is present within this data processing system.

AND gate 28 is disabled if signal M256PR- is a binary ZERO indicating that there is a minimum of 512K words of memory in the data processing system (see rows 3 and 4 of Table 2). NAND gate 28 is also disabled if signal MDDBEN- is a binary ZERO indicating that the memory modules present within the system are of the double density type and therefore there is a minimum of 256K words of memory present in the data processing system (see rows 2 and 4 of Table 2). Finally, AND gate 28 is disabled if signal TWOPRS- is a binary ZERO indicating that memory module 2 102 is present in the system. Because the configuration rules call for memory module 1 to be present within all systems, the present memory module 2 indicates that, at a minimum, there are two memory modules present. Since the smallest memory module that is available in the system contains 128K words of memory, therefore two of the smallest modules mean that at a minimum there is 256K words of memory present within the system. By combining all three of these conditions, NAND gate 28 will be disabled and its output, signal MEMBK2-, will be a binary ZERO if there is a minimum of 25&K words of memory present within the system. NAND gate 40 is partially enabled by signal CPBXOB+ being a binary ONE which indicates at a minimum there must be 246K words of memory present in the system if the address is to fall within the range of the physically present memory (see row 2 of Table 3). Therefore, signal MEMBK2- at the other input of NAND gate 40 will disable the NAND gate and cause its output, signal CP2KWX-, to be a binary ONE if the minimum amount of memory required by the address is physically present within the system.

The output of NAND gates 36, 38 and 40 will each be a binary ONE and partially enable NAND gate 48 if the amount of memory physically present within the system is sufficient to guarantee that any location that can be addressed by having a binary ONE in any of the three most significant bits of a 20 bit address lies within the physically memory actually present within the data processing system. Therefore, since signal MEMKIL- is also normally a binary ONE, NAND gate 48 will be fully enabled and cause its output, signal NONMEM+, to be a binary ZERO if the CPU is attempting to access a memory location that is present within the memory. Signal NONMEM+ will be a binary ONE indicating an attempt to access a location not present in memory if any output of NAND gates 36, 38 or 40 is a binary ZERO indicating that the address exceeds the memory or if signal MEMKIL- is a binary ZERO which is used by the CPU to force a memory access error.

It should be noted that bit 17 which corresponds to address signal CPBXOA+ from the CPU or BSA-DO6+ from the common bus is not used within the logic of FIG. 2 because when bit 17 is a binary ONE, it indicates that the address lies within the range of 64K to 128K-1 words. Since the minimum memory module contains 128K words of memory, as long as the configuration rules which requires that memory module 1 101 must be present in the system is met, the data processing system must contain, at a minimum, 128K words of memory. Therefore, any address which contains a ONE in bit 17 or less significant bits must be present within all data processing systems.

The output of NAND gate 48, signal NONMEM+, is only valid when the CPU 108 is attempting to access the memory and therefore signal NONMEM+ at the data (D) input of flip-flop 52 is clocked by signal MEMREF- at the clock (C) input transitioning from the binary ZERO to the binary ONE state. Therefore, it an attempt is made by the CPU to access a memory location that is not physically present within the data processing system, signal NONMEM+ will be a binary ONE and the clocking of flip-flop 52 will result in the flip-flop being set and cause its Q output, signal NOMEMY+, to be a binary ONE.

Signal NOMEMY+ is used by the CPU logic to indicate that an attempt has been made to access a nonexistent memory location by the CPU and the CPU firmware traps to a software error handling routine. If the address from the CPU is within the memory physically present within the system, signal NONMEM+ will be a binary ZERO, which when clocked into flip-flop 52, will result in the Q output signal, NOMEMY+ being a binary ZERO indicating that the address is within the memory present in the system. Flip-flop 52 may be cleared by signal CLEARP- becoming a binary ZERO at the reset (R) input which occurs when the system is initialized. The Q-bar output of flip-flop 52, signal NOMEMY-, is fed back to the set (S) input so that once set, flip-flop 52 can be reset only by a binary ZERO on the reset (R) input and will be unaffected by the clocking of a binary ZERO at its data (D) input.

AND gates 42, 44 and 46 perform an analogous function for the three most significant bits of a memory address from the common bus 107 as was performed by NAND gates 36, 38 and 40 for the three most significant bits of an address from the CPU with the exception that their output signals, IO1MWX-, IO5KWX- and IO2KWX- will be binary ZEROs if the address is within the physical memory and a binary ONE if the address falls outside the physical memory. Therefore, as long as any location addressable by each of the three most significant bits taken individually is within the physical memory present in the data processing system, signals IO1MWX-, IO5KWX- and IO2KWX- will all be binary ZEROs and will not enable NOR gate 50 thereby causing its output, signal MECYCLE+, to be a binary ONE. During a memory access operation in which the address to the memory is coming from common bus 107, which means that signals BSADO3+, BSADO4+ and BSADO5+ are active, signal BSMREF-, which is one input to NOR gate 50, will also be a binary ZERO and therefore not enable NOR gate 50. The other input to NOR gate 50, signal MODPAR-, is normally a binary ZERO during a memory access by an I/O controller but becones a binary ONE when bad module party occurs.

The output of NOR gate 50 will normally be a binary ONE if the address being presented by an I/O controller is within the memory physically present in the data processing system and will be a binary ZERO if the address specified in the three most significant bits of the address represents a location which is not physically present in the memory in the data processing system. Thus, signal MECYCLE+ will be a binary ONE at the data (D) input of flip-flop 54 and will be clocked into flip-flop 54 by signal BSDCND+ transitioning from the binary ZERO to the binary ONE state at the clock (C) input. This clocking of signal MECYCLE+ into flip-flop 54 will result in its Q output, signal MEMCYL+, being a binary ONE if the memory location being accessed is within the physical memory and a binary ZERO if the memory location is not within the physical memory. Flip-flop 54 is cleared at the end of each common bus cycle by signal BSDCNB+ transitioning to the binary ZERO state. Memory controller logic 109 uses a binary ONE of signal MEMCYL+ to enable the reading or writing of the addressed memory location and to cause a positive acknowledgement via common bus 107 to the I/O controller. An attempt to access a nonexistent memory location by an I/O controller will result in flip-flop 54 remaining reset and cause signal MEMCYL+ to remain a binary ZERO which result in no positive acknowledgement being generated on common bus 107 to the I/O controller. The absence of a positive acknowledgement being sent to the I/O controller will be detected by the CPU, which monitors the time between requests and acknowledgements on the common bus 107. This CPU monitoring will result in a bus timeout within the CPU and result in the CPU generating a negative acknowledgement which is sent to the I/O controller thus indicating to the I/O controller that the memory access that it had requested is denied.

From the above discussion, it will be appreciated by those skilled in the art that the two configuration rules that require that memory module 1 always be present in the system and that both memory module 1 and memory module 2 be of the same type can be relaxed if other logic is added to the logic in FIG. 2. It will be further appreciated by those skilled in the art that the number of memory modules that may be contained in the system can also be either reduced or increased over the two found in the preferred embodiment and that other address coding and memory module types and sizes may be used.

While the invention has been shown and described with reference to the preferred embodiment thereof, it will be understood by those skilled in the art that the above and other changes in form and detail may be made therein without departing from the spirit and scope of the invention.

What is claimed is:

1. A method of determining the amount of memory physically present within a system capable of containing one or more memory modules, wherein each memory module contained in the system can be one of several different types with every type of memory module having a predetermined number of memory locations, said method comprising the steps of:

A. constructing said system to have a plurality of positions to which each of said memory modules can be physically connected;

B. receiving from each of said plurality of positions a first signal which when in a first state indicates that a one of said memory modules is physically present and when in a second state indicates that said one of said memory modules is not physically present;

C. receiving from each of said plurality of positions a number of signals which are in different states for each one of said several different types of memory modules, said number of signals including, a second signal in a first state specifying a first memory chip capacity and in a second state specifying a second memory chip capacity, a third signal in a first state specifying a first memory module capacity and in a second state specifying a second memory module capacity and a fourth signal specifying that a second memory module is present;

D. computing the amount of memory physically present by using logic circuits responsive to each state of said number of signals corresponding to a predetermined amount of memory and that said logic circuits are responsive to said first signal in said first state to indicate the said predetermined amount of memory is physically present;

E. writing a predetermined value into at least one location of each possible increment of memory;

F. reading back said predetermined value from said at least one location of each possible increment of memory;

G. comparing said predetermined value written into said at least one location with said predetermined value read from said at least one location;

H. verifying that a successful access is made to each possible increment of memory that is indicated to be physically present; and I. verifying that no successful access is made to any possible increment of memory that is computed not to be physically present.

2. The method of claim 1 further including the steps of:
  A. using said first signal and said number of signals to generate a precoded table, each line of said precoded table being identified by an index number specified by said first signal and said number of signals;
  B. selecting a line of said precoded table identified by said index number, said line indicating the amount of memory physically present.

3. The method of claim 1 further including the steps of:
  A. determining the maximum amount of physical memory as indicated by said number of signals;
  B. writing into and reading out of each location of memory said predetermined value;
  C. testing for equals of said predetermined value written into said each location of memory with said predetermined value read out of said each location of memory;
  D. verifying that the number of equal readings equals the maximum amount of physical memory as indicated by said number of signals; and
  E. testing that said predetermined value was read out of said each location of memory thereby verifying a first configuration rule requiring that memory modules be connected in consecutive positions starting with a first position and that there be no vacant positions between any two occupied positions.

4. The method of claim 3 further including the steps of:
  A. placing a first memory board in a first position;
  B. testing that said first signal is in said first state;
  C. removing said first memory board from said first position;
  D. testing that said first signal is in said second state;
  E. placing each subsequent memory board in turn in its subsequent position;
  F. testing that said first signal is in said first state;
  G. removing said each subsequent board in turn from its subsequent position; and
  H. testing that said first signal is in said second state.

5. The method of claim 4 further including the steps of:
  A. determining from said index number the maximum amount of memory and the number of memory modules;
  B. writing into and reading out of said each location of each memory module said predetermined value;
  C. testing that said predetermined value was read out of said each location; and
  D. verifying that said predetermined number was read from the same number of locations of said each module thereby verifying a second configuration rule wherein all memory modules physically present within the system be of the same type and therefore only one set of said number of signals are required to indicate the memory configuration.

6. The method of claim 5 further including the steps of:
  A. combining said number of signals from all of said plurality of positions to provide said one set of said number of signals; and
  B. testing said state of said number of signals to indicate that if the said second configuration rule requiring all the same type of memory modules is not followed, said number of signals will indicate that the memory module type that is physically connected in the system is said first type if said first type has a larger number of memory locations than said second type, and, is said second type if said second type has said larger number of memory locations.

7. The method of claim 6 further including the steps of:
  A. writing said predetermined value in said at least one location in said each possible increment of memory in said system;
  B. reading said predetermined value in said at least one location in said each possible increment of memory;
  C. comparing said predetermined value read with said predetermined value written of said each attempted access; and
  D. testing for the violation of said second configuration rule requiring all memory modules to be physically present in the system by verifying that said predetermined value written was not equal to said predetermined value read for at least one memory module position.

8. The method of claim 6 further including the step of combining each kind of said number of signals by wire ORing them together and wherein said number of signals are comprised of a plurality of binary signals having a ground voltage state as one of their two states and wherein said ground voltage state indicates the larger of said first or said second type of memory modules.

9. The method of claim 8 further including the step wherein said number of signals are comprised of two binary encoded signals indicating 4 different types of memory modules.

10. The method of claim 9 further including the steps of:
  A. writing in said predetermined value each location of each memory location;
  B. reading in turn said predetermined value from said each location; and
  C. testing that said predetermined value written and the subsequent predetermined value read for unequals indicating a failed memory module which may be repaired or replaced.

11. A method of determining if an addressed memory location is physically present within a system, each time an address is presented to memory within a system capable of containing one or more memory modules, wherein each memory module contained in the system can be one of several different types with every type of memory module having a predetermined number of memory locations, said method comprising the steps of:
  A. constructing said system to have a plurality of positions to which each of said memory modules can be physically connected;
  B. receiving from each of said plurality of positions a first signal which when in a first state indicates that a one of said memory modules is physically present and when in a second state indicates that one of said memory modules is not physically present;
  C. receiving from each of said plurality of positions a number of signals which are in a different state for each one of said several different types of memory modules;

D. computing an address of a last memory location physically present in memory based on the states of said first and said number of signals from said plurality of memory modules;

E. comparing said address presented to memory with said address of a last memory location physically present in memory;

F. generating a third signal in a first state if the result of said compare indicates that said address presented to memory corresponds to a location physically present in memory and generates said third signal in a second state if said compare indicates that said address presented to memory corresponds to a location not physically present in memory.

G. writing a predetermined value in each memory location of each memory module;

H. reading the contents of said each memory location by applying consecutive addresses;

I. storing a first address of said each memory module for which no predetermined value was read; and J. comparing the corresponding high order bits of said first address of said each memory module to identify a memory module type having the least number of locations.

12. The method of claim 11 further comprising the steps of:

A. generating said address by a central processor unit or an input/output controller; and B. applying said address to memory.

13. The method of claim 12 further including the steps of:

A. generating a fourth signal if said address presented to memory is generated by said central processor unit; and B. generating a fifth signal if said address presented to memory is generated by said input/output controller.

14. The method of claim 13 wherein said steps of computing said address of a last memory location physically present in memory and said step of comparing said address presented to memory with said address of a last memory location physically present in memory are done as one step by combinatorial logic.

15. The method of claim 14 further incuding the steps of:

A. automatically forcing said first signal in said first state whenever a memory module is connected to its corresponding one of said plurality of positions; and B. each of said first signals, one for each of said plurality of positions being forced into said second state whenever a memory module is not connected to its corresponding one of said plurality of positions.

16. The method of claim 15 further including the step of combining said number of signals therefore only one set of said number of signals are required to indicate the memory configuration since all memory modules physically present within the system must be of the same type.

17. The method of claim 16 further including the steps of:

A. writing a predetermined value into at least one location in each possible increment of memory;

B. reading said predetermined value from said at least one location in said each possible increment of memory; and C. testing for the violation of said configuration rule requiring all memory modules to be physically present within said system by reading the contents of said least one location and in said each possible increment of memory and not finding said predetermined value.

18. The method of claim 16 including the steps of:

A. combining said number of signals by wire Oring them together and wherein said number of signals are comprised of a plurality of binary signals having a ground voltage state as one of their two states;

said ground voltage state indicating the larger types of memory modules.

19. The method of claim 18 wherein said number of signals are comprised of two binary encoded signals indicating 4 different types of memory modules.

20. The method of claim 19 wherein a diagnostic test is performed on each memory module including the steps of:

A. writing a predetermined value into each location determined to be present in the system;

B. reading said each location; and

C. comparing said for differences, the contents of each location read with what was written to indicate the failed module which can then be repaired or replaced.

21. An apparatus for determining an amount of memory physically present within a system, said system capable of containing one or more memory modules, wherein each of said one or more memory modules contained in said system can be one of several different types, wherein each type of memory module has a predetermined number of memory locations, said apparatus comprising:

A. a plurality of connector means each connecting to one of said plurality of memory modules, each of said plurality of connector means generating a first signal and a number of signals;

B. a first receiving means coupled to said plurality of connector means for receiving said first signal from each of said connector means, said first signal when in a first state indicating that one of said memory modules is physically connected to a one of said connector means and when in a second state indicating that a one of said memory modules is not physically connected to said connector means;

C. a second receiving means coupled to said plurality of connector means for receiving said number of signals, said number of signals having different types of memory modules which can be connected to said connector means;

D. a computing means coupled to said first and said second receiving means for computing the amount of memory physically present in said system by using logic circuit means included in said first and said second receiving means and responsive to each state of said number of signals corresponding to a predetermined amount of memory if its corresponding first signal is in said first state;

E. a memory writing means coupled to each of said plurality of memory modules for writing a predetermined value into at least one location of said each of said plurality of memory includes;

F. a memory reading means for reading back said predetermined value for said at least one location of said each of said plurality of memory includes;

G. a computing mean coupled to said memory reading means for computing said predetermined value written into said at least one location with said predetermined value read from said at least one location; and H. a verifying means coupled to said computing means for indicating a successful access to each possible of said each of said plurality of memory modules that is indicated to be physically present, and that successful access is made to any possible of said each of said plurality of memory modules that is computed not to be physically present.

22. An apparatus for determining if an addressed memory location is physically present within a system, said system capable of containing one or more memory modules, wherein each of said one or more memory modules contained in said system can be one of several different types, wherein each type of memory module has a predetermined number of memory locations, said apparatus comprising:

A. a plurality of connector means each connecting to one of said plurality of memory modules, each of said plurality of connector means generating a first signal and a number of signals;

B. a first receiving means coupled to said plurality of connector means for receiving said first signal from each of said connector means, said first signal when in a first state indicating that one of said memory modules is physically connected to a one of said connector means and when in a second state indicating that a one of said memory modules is not physically connected to said connector means;

C. a second receiving means coupled to said plurality of connector means for receiving said number of signals, said number of signals having different states for each one of several different types of memory modules which can be connected to said connector means, said number of signals including, a second signal in a first state specifying a first memory chip capacity and in a second state specifying a second memory chip capacity, a third signal in a first state specifying a first memory module capacity and in a second state specifying a second memory module capacity and a fourth signal specifying that a second memory module is present;

D. a computing means for computing an address of a last memory location physically present in memory based on the states of said first and number of signals from said plurality of memory modules;

E. a comparing means coupled to said computing means for comparing said address presented to memory with said address of a last memory location physically present in memory;

F. a generating means coupled to said comparing means for generating a third signal in a first state if the result of said compare indicates that said address presented to memory corresponds to a location physically present in memory and generates said third signal in a second state if said compare indicates that said address presented to memory corresponds to a location not physically present in memory;

G. a memory writing means coupled to each of said plurality of memory modules for writing a predetermined value into at least one location of said each of said plurality of memory includes;

H. a memory reading means for reading back said predetermined value for said at least one location of said each of said plurality of memory includes;

I. a computing mean coupled to said memory reading means for computing said predetermined value written into said at least one location with said predetermined value read from said at least one location; and J. a verifying means coupled to said computing means for indicating a successful access to each possible of said each of said plurality of memory modules that is indicated to be physically present, and that successful access is made to any possible of said each of said plurality of memory modules that is computed not to be physically present.

* * * * *